(12) United States Patent
Amonou et al.

(10) Patent No.: US 8,014,403 B2
(45) Date of Patent: Sep. 6, 2011

(54) METHOD OF PROCESSING MULTIMEDIA CONTENT DESCRIPTION DATA SETS, AND CORRESPONDING APPARATUS

(75) Inventors: Isabelle Amonou, Thorigne Fouillard (FR); Christian Bertin, Rennes (FR)

(73) Assignee: France Telecom, Paris (FR)

( * ) Notice: Subject to any disclaimer, the term of this patent is extended or adjusted under 35 U.S.C. 154(b) by 868 days.

(21) Appl. No.: 10/558,925

(22) PCT Filed: May 27, 2004

(86) PCT No.: PCT/FR2004/001317
§ 371 (c)(1),
(2), (4) Date: Feb. 20, 2007

(87) PCT Pub. No.: WO2004/110015
PCT Pub. Date: Dec. 16, 2004

(65) Prior Publication Data
US 2007/0186255 A1    Aug. 9, 2007

(30) Foreign Application Priority Data
May 30, 2003  (FR) ...................................... 03 06583

(51) Int. Cl.
*H04L 12/28* (2006.01)
(52) U.S. Cl. ............. 370/395.21; 370/395.1; 370/395.2; 370/463
(58) Field of Classification Search .................. 370/352, 370/395.1, 395.21, 395.4, 395.43, 419, 420, 370/463, 487
See application file for complete search history.

(56) References Cited

U.S. PATENT DOCUMENTS

| | | | |
|---|---|---|---|
| 6,337,881 B1 | 1/2002 | Chaddha | |
| 6,728,775 B1* | 4/2004 | Chaddha | 709/231 |
| 6,798,838 B1* | 9/2004 | Ngo | 375/240.19 |
| 7,009,971 B2* | 3/2006 | Novaes | 370/390 |
| 7,272,652 B1* | 9/2007 | Keller-Tuberg | 709/227 |
| 7,359,980 B2* | 4/2008 | Gemmell | 709/231 |
| 2002/0126698 A1 | 9/2002 | Deshpande | |

OTHER PUBLICATIONS

Wei Zhao et al; "Efficient Adaptive Media Scaling and Streaming of Layered Multimedia in Heterogeneous Environment"; Multimedia Computing and Systems, 1999 IEEE.

Chow, R. K. Y., et al; "Scalable Video Delivery to Unicast Handheld-Based Clients"; IEEE Journal; Sep. 5, 2000; pp. 93-98.

* cited by examiner

*Primary Examiner* — Donald Mills
(74) *Attorney, Agent, or Firm* — Robert L. Epstein; Epstein Drangel LLP

(57) ABSTRACT

This method of processing multimedia content description data sets to deliver a plurality of output data sets ($14_1$, $14_2$, ..., $14_n$) from a single input data set (10), the method being characterized in that it comprises the following steps: allocating priority coefficients (16) to at least some of the description data in the input data set (10); associating priority coefficient thresholds (18) with a predetermined number of output data sets ($14_1, 14_2, ..., 14_n$); and distributing the data to the output data sets ($14_1, 14_2, ..., 14_n$) as a function of the priority coefficients (16) allocated to the elements of the input data set and as a function of the thresholds (18) associated with each of the output data sets.

10 Claims, 2 Drawing Sheets

METHOD OF PROCESSING MULTIMEDIA CONTENT DESCRIPTION DATA SETS, AND CORRESPONDING APPARATUS

CROSS-REFERENCE TO RELATED APPLICATIONS

Not Applicable

STATEMENT REGARDING FEDERALLY SPONSORED OR RESEARCH DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION (1) Field of the Invention

The present invention relates to a method of processing multimedia content description data sets in order to deliver a plurality of output data sets from a single input data set. The invention also relates to the use of such a method.

(2) Description of Related Art Including Information Disclosed Under 37 CFR 1.97 and 1.98

Methods are known for generating multimedia content description data sets, in particular in application of the digital video broadcast (DVB) standard. Once generated, such data sets are intended for transmission to remote storage means in the form of files, or merely to be broadcast together with the multimedia content with which they are associated. However, once these data sets have been generated, their size cannot be modified, in particular in order to respond to constraints in the broadcast network or to constraints in the remote storage means. In other words, once the description data set has been generated by the service operator or the network operator, it is sent to receivers of that data without it being possible to modify the data dynamically.

In a DVB broadcast network, when transferring data in MPEG2 format, the available instantaneous data rate is high and constant, which makes it easy to transmit such description data sets. In contrast, on a network of the Internet type, in which quality of service is variable, transmitting such data sets can give rise to problems, particularly when the data sets are too voluminous. In other words, something that does not pose any problem with conventional broadcasting can become problematic in the context of the Internet.

BRIEF SUMMARY OF THE INVENTION

The invention seeks to remedy this drawback by providing a method of processing description data sets that makes it possible, when generating said data sets, to take account of constraints concerning the broadcast network or concerning the destination storage means for the data sets.

The invention thus provides a method of processing multimedia content description data sets to deliver a plurality of output data sets from a single input data set, the method being characterized in that it comprises the following steps:

allocating priority coefficients to at least some of the description data in the input data set;

associating priority coefficient thresholds with a predetermined number of output data sets; and distributing the data to the output data sets as a function of the priority coefficients allocated to the elements of the input data set and as a function of the thresholds associated with each of the output data sets.

Thus, as a function of the priority coefficients allocated to each description data item, the items are distributed amongst different output data sets that are associated with different priorities. This makes it possible to select which output data set should be transmitted to any particular destination, as a function of network constraints for reaching that destination or as a function of the storage capacities of that destination.

A method of processing data sets in accordance with the invention may also comprise the following characteristics:

allocating a predetermined specific priority coefficient to description data that must be contained in all of the output data sets;

each description data item to which a priority coefficient is allocated, other than said specific priority coefficient, is contained in only one of the output data sets that is determined as a function of the thresholds associated with the output data sets;

each description data item to which a priority coefficient is allocated other than said specific priority coefficient is contained in one or more of the output data sets as determined as a function of the thresholds associated with the output data sets, such that all of the data of any one output data set is contained in all other output data sets containing data of lower priority than the data of said any one output data set;

the method further comprises a step of transmitting at least one of the output data sets to a destination as a function of the capacities of means for transmitting description data to the destination;

the method further comprises a step of transmitting at least one of the output data sets to a destination as a function of the capacities of storage means of the destination;

the method further comprises a step of transmitting at least one of the output data sets to a destination as a function of a subscription level of the user to a predetermined service; and the method further comprises a step of transmitting at least one of the output data sets to a destination as a function of a payment made previously for access to said data set.

The invention also provides the use of a method of processing description data sets as defined above, for the purpose of processing an XML data file.

Finally, the invention also provides a computer program adapted to process multimedia content description data sets in order to deliver a plurality of output data sets from a single input data set, the program being characterized in that it comprises:

means for reading a set of priority coefficients allocated to at least some of the description data in the input data set;

means for reading a set of priority coefficient thresholds associated with a predetermined number of output data sets; and means for distributing data to the output data sets as a function of the priority coefficients allocated to the elements of the input data sets and as a function of the thresholds associated with each of the output data sets.

BRIEF DESCRIPTION OF THE SEVERAL VIEWS OF THE DRAWING(S)

The invention can be better understood with the help of the following description given purely by way of example and made with reference to the accompanying drawings, in which.

Figure 3:
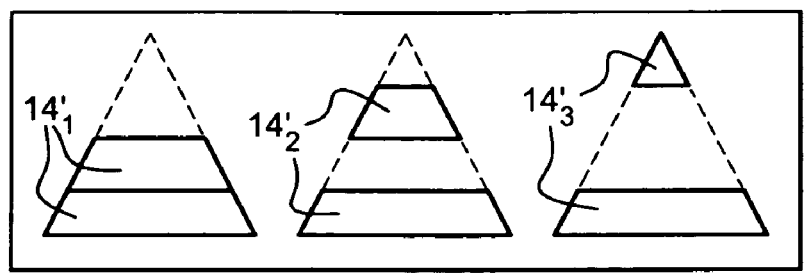
Figure 4:
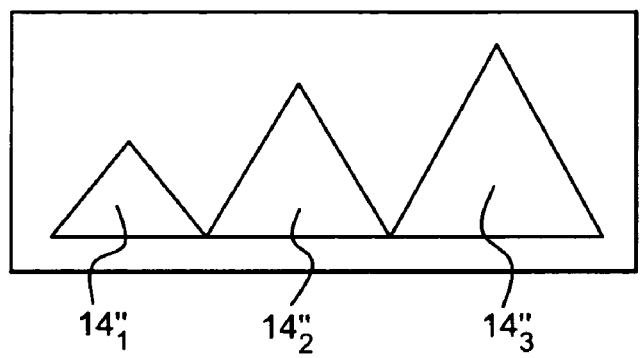
Figure 5:
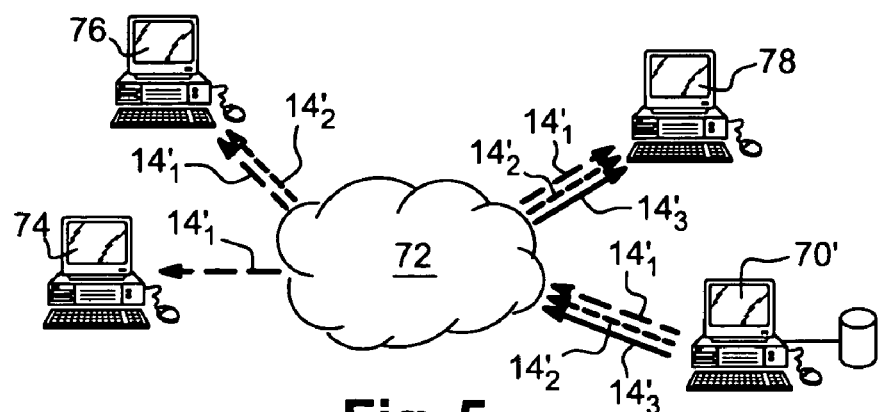
Figure 6:
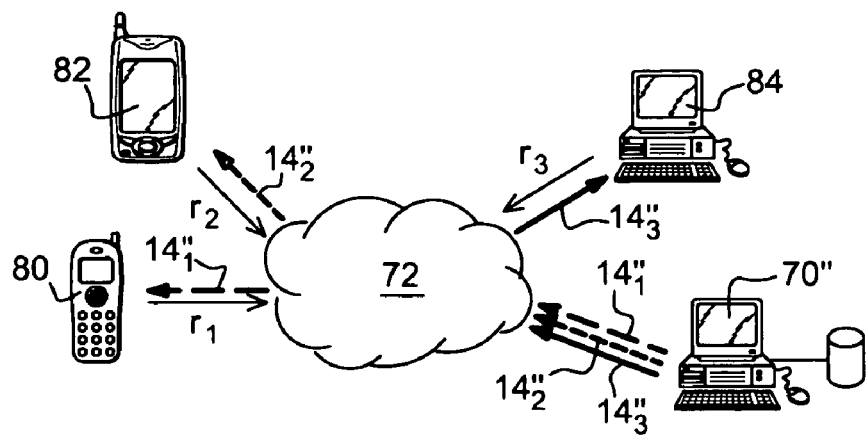

FIG. 3 symbolizes output files delivered by a method in a first implementation of the invention;

FIG. 4 symbolizes output files delivered by a method in a second implementation of the invention;

FIG. 5 is a diagram showing the general structure of a first system enabling a method of the invention to be used; and FIG. 6 is a diagram showing the general structure of a second system enabling a method of the invention to be used.

DETAILED DESCRIPTION OF THE INVENTION

Figure 1:
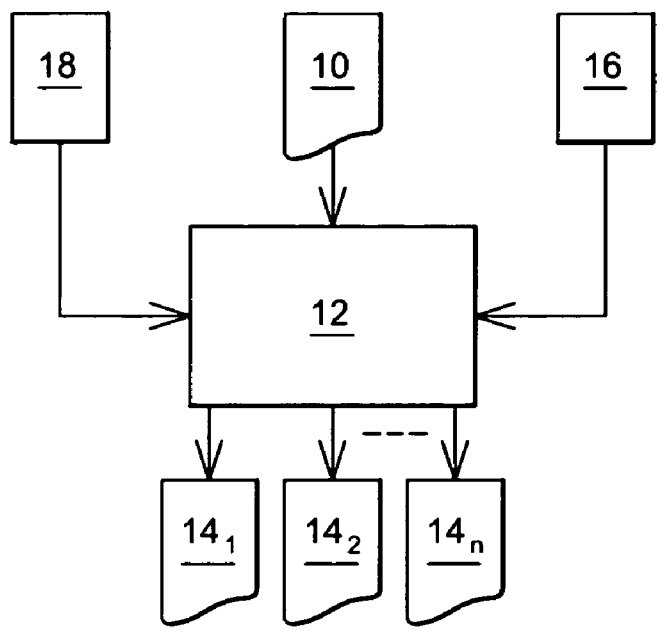
FIG. 1 is a diagram showing the structure of a system for implementing a method of processing data sets in accordance with the invention.

The system shown in FIG. 1 comprises an input data set 10 in eXtended Markup Language (XML) for processing by a filter 12, in order to deliver a plurality of output data sets $14_1$, $14_2$, ..., $14_n$ at the output from the filter, each of these output data sets comprising some of the XML data contained in the data set 10.

It should be observed that XML data constitutes merely one example of description data and that the invention can equally well be applied to description data complying with some other standard.

By way of example, the filter 12 is an executable program stored on a microcomputer (not shown).

The filter 12 is adapted to receive as input, a file 16 containing priority coefficients associated with each of the description data items of the XML data set 10. Each XML data item is either an element delimited between an opening tag and a closing tag having the same name in the XML data set 10, or else an attribute attached to the element. The file 16 then associates each XML data item with a priority coefficient.

The filter 12 is also adapted to receive as input, a file 18 comprising priority coefficient thresholds, these thresholds being associated with the respective data sets $14_1$, $14_2$, ..., $14_1$.

In a preferred implementation, the greater the priority coefficient allocated to a data item, then the lower the priority of the data is associated with the coefficient. Thus, a priority coefficient equal to zero is allocated to the most important description data, i.e. the data that must be contained in all of the output data sets $14_1$, $14_2$, ..., $14_n$. Thereafter, the other data items are allocated coefficients that are strictly positive, and that are determined as a function of their importance. Finally, the least important description data need not have any priority coefficient allocated thereto, providing it is assumed that no coefficient corresponds to an infinite coefficient.

In a preferred implementation, the file 18 of priority coefficient thresholds has n threshold values $N_1, \ldots, N_n$.

The filter 12 is then configured:

to copy into data set $14_1$, the data associated with the zero priority coefficient and data associated with priority coefficients that are less than or equal to $N_1$;

to copy into the data set $14_2$, the data associated with the zero priority coefficient and data associated with priority coefficients that are strictly greater than $N_1$ and less than or equal to $N_2$;

... ;

to copy into the data set $14_n$, the data associated with the zero priority coefficient and data associated with priority coefficients strictly greater than $N_{n-1}$ and less than or equal to $N_n$.

In a variant, the filter 12 may also be configured to copy into an additional data set $14_{n+1}$ the data associated with the zero priority coefficient, and data associated with priority coefficients strictly greater than $N_n$, and in particular data associated with no priority coefficient.

As a result, the output data sets $14_1$, $14_2$, ..., $14_n$ (and possibly $14_{n+1}$) have the property of being complementary, i.e. the description data they contain is different with the exception of the description data associated with the zero priority coefficient.

The output data sets $14_1$, $14_2$, ..., $14_n$ are then intended for transmission through a data transmission network or for storage in storage means of one or more destinations.

For an application to audiovisual content description data, the output data set $14_1$ contains the most important data, e.g. the title or the duration of a film, whereas the other data sets $14_2$, ..., $14_n$ (and possibly $14_{n+1}$) contain data of less and less importance, such as, for example, the actors or the date a film was made.

To illustrate more precisely the above-described system, the input data set is, for example, an XML table such as the table below, inspired by the specifications of the TV-Anytime forum:

```
<TVAMain>
    <ProgramLocationTable version="11">
        <Schedule>
            <Event>
                <Program crid="crid://www.ft.com/Lancelot"/>
                <EventDescription>
                    <PublishedTime 2000-05-31T17:10:00/>
                    <PublishedDuration P1Y0M0DT01H35M00S/>
                </EventDescription>
            </Event>
            <Event>
                <Program crid="crid://www.ft.com/Viviane"/>
                <EventDescription>
                    <PublishedTime 2000-05-31T14:00:00/>
                    <PublishedDuration P1Y0M0DT01H35M00S/>
                </EventDescription>
            </Event>
            <Event>
                <Program crid="crid://www.ft.com/Merlin"/>
                <EventDescription>
                    <PublishedTime2000-05-31T12:10:00/>
                    <PublishedDurationP1Y0M0DT01H35M00S/>
                </EventDescription>
            </Event>
            <Event>
                <Program crid="crid://www.ft.com/Arthur"/>
                <EventDescription>
                    <PublishedTime 2000-05-31T16:10:00/>
                </EventDescription>
            </Event>
        </Schedule>
    </ProgramLocationTable>
    <ProgramInformation version="9"
    programId="crid://www.FT.com/Merlin">
        <BasicDescription>
            <Title> Concert </ Title >
        </BasicDescription>
    </ProgramInformation>
    <ProgramInformation version="13"
```

```
programId="crid://www.FT.com/Viviane">
    <BasicDescription>
        <Title> Fairy </ Title >
    </BasicDescription>
</ProgramInformation>
<ProgramInformation version="11"
programId="crid://www.FT.com/Lancelot">
    <BasicDescription>
        <Title> Knight </ Title >
    </BasicDescription>
</ProgramInformation>
<ProgramInformation version="15"
programId="crid://www.FT.com/Arthur">
    <BasicDescription>
        <Title> King </ Title >
    </BasicDescription>
</ProgramInformation>
</TVAMain>
```

A file constructing priority coefficients could be the following file, for example:

```
//sort chronologically by date
Operation (field=(dateTime)Schedule/Event/PublishedTime( ),
mode="sort")
Filter (
// delete past events (Merlin)
Event[((dateTime) EventDescription/PublishedTime( ) +
    (duration) EventDescription/PublishedDuration( )) <
    2000-05-31T14:30:00
]: remove
)
//give max priority to current and future events
Filter(
ProgramInformation[position( )<=2] : 1
ProgramInformation[position( )>2 & position( )<4] : 3
)
VarList = Operation( field = Schedule/Event/Program/@crid ,
mode="extraction")
Filter(
ProgramInformation[/@programId( ) ==
    one of the values of VarList[1:2] : 1
ProgramInformation[/@programId( ) ==
    one of the values of VarList[3:*] : 3
Schedule/Event[Program/@crid( ) == one of the values of
VarList[1:2] : 1
Schedule/Event[Program/@crid( ) == one of the values of
VarList[3:*] : 3
)
```

It can be seen that this file includes instructions for giving priority coefficients to each data item in the input file 10, together with instructions seeking to sort the XML data of the input table, or to delete some of it.

The data in the input table may include inheritance relationships between different items, such that a parent item (e.g. data item TVAMain) having at least one descendent can inherit the priority coefficient of that descendent.

This enables the following file 16 of priority coefficients to be generated (presented in the form of a table):

| Element | Priority/state |
|---|---|
| <TVAMain> | 1 |
|   <ProgramLocationTable version="11"> | 1 |
|     <Schedule> | 1 |
|       <Event> | Deleted |
|         <Program crid="crid://www.ft.com/Merlin"/> | Deleted |
|         <EventDescription> | Deleted |
|           <PublishedTime2000-05-31T12:10:00/> | Deleted |
|           <PublishedDurationP1Y0M0DT01H35M00S/> | Deleted |
|         </EventDescription> | |
|       </Event> | |
|       <Event> | 1 |
|         <Program crid="crid://www.ft.com/Viviane"/> | 1 |
|         <EventDescription> | 1 |
|           <PublishedTime 2000-05-31T14:00:00/> | 1 |
|           <PublishedDuration P1Y0M0DT01H35M00/> | 1 |
|         </EventDescription> | |
|       </Event> | |
|       <Event> | 1 |
|         <Program crid="crid://www.ft.com/Arthur"/> | 1 |
|         <EventDescription> | 1 |
|           <PublishedTime 2000-05-31T16:10:00/> | 1 |
|         </EventDescription> | |
|       </Event> | |
|       <Event> | 3 |
|         <Program crid="crid://www.ft.com/Lancelot"/> | 3 |
|         <EventDescription> | 3 |
|           <PublishedTime 2000-05-31T17:10:00/> | 3 |
|           <PublishedDuration P1Y0M0DT01H35M00S/> | 3 |
|         <EventDescription> | |
|       </Event> | |
|     </Schedule> | |
|   </ProgramLocationTable> | |
| <ProgramInformation version="9" | 65000 |
| programId="crid://www.FT.com/Merlin"> | |
|   <BasicDescription> | 65000 |
|     <Title> Concert </ Title > | 65000 |
|   </BasicDescription> | |
| </ProgramInformation> | |
| <ProgramInformation version="13" | 1 |

-continued

| Element | Priority/state |
|---|---|
|     programId="crid://www.FT.com/Viviane"> | |
|         <BasicDescription> | 1 |
|             <Title> Fairy </ Title > | 1 |
|         </BasicDescription> | |
|     </ProgramInformation> | |
|     <ProgramInformation version="11" | 3 |
|     programId="crid://www.FT.com/Lancelot"> | |
|         <BasicDescription> | 3 |
|             <Title> Knight </ Title > | 3 |
|         </BasicDescription> | |
|     </ProgramInformation> | |
|     <ProgramInformationversion="15" | 1 |
|     programId ="crid://www.FT.com/Arthur"> | |
|         <BasicDescription> | 1 |
|             <Title> King </ Title > | 1 |
|         </BasicDescription> | |
| </TVAMain> | |

The file 18 containing the thresholds is the following file, for example:
Level N1=2
Level N2=4
Level N3=65000
where the number 65000 represents infinity.

Applying the filter 12 to the above XML table with the files 16 and 18 given as examples produces two output XML tables 14$_1$ and 14$_2$.

The first XML table 14$_1$ contains the following data:

```
<TVAMain>
    <ProgramLocationTable version="11">
        <Schedule>
            <Event>
                <Program crid="crid://www.ft.com/Viviane"/>
                <EventDescription>
                    <PublishedTime 2000-05-31T14:00:00/>
                    <PublishedDuration P1Y0M0DT01H35M00S/>
                </EventDescription>
            </Event>
            <Event>
                <Program crid="crid://www.ft.com/Arthur"/>
                <EventDescription>
                    <PublishedTime 2000-05-31T16:10:00/>
                </EventDescription>
            </Event>
        </Schedule>
    </ProgramLocationTable>
    <ProgramInformation programId="crid://www.FT.com/Viviane">
        <BasicDescription>
            <Title> Concert </ Title >
        </BasicDescription>
    </ProgramInformation>
    <ProgramInformation programId="crid://www.FT.com/Arthur">
        <BasicDescription>
            <Title> Fairy </ Title >
        </BasicDescription>
    </ProgramInformation>
</TVAMain>
```

The second XML table 14$_2$ contains the following data:

```
<TVAMain>
    <ProgramLocationTable version="11">
        <Schedule>
            <Event>
                <Program crid="crid://www.ft.com/Lancelot"/>
```

-continued

```
                <EventDescription>
                    <PublishedTime>2000-05-31T17:10:00/>
                    <PublishedDuration>P1Y0M0DT01H35M00S/>
                </EventDescription>
            </Event>
        </Schedule>
    </ProgramLocationTable>
    <ProgramInformation version="11" programId=
    "crid://www.FT.com/Lancelot">
        <BasicDescription>
            <Title> Knight </ Title >
        </BasicDescription>
    </ProgramInformation>
<TVAMain>
```

Figure 2:
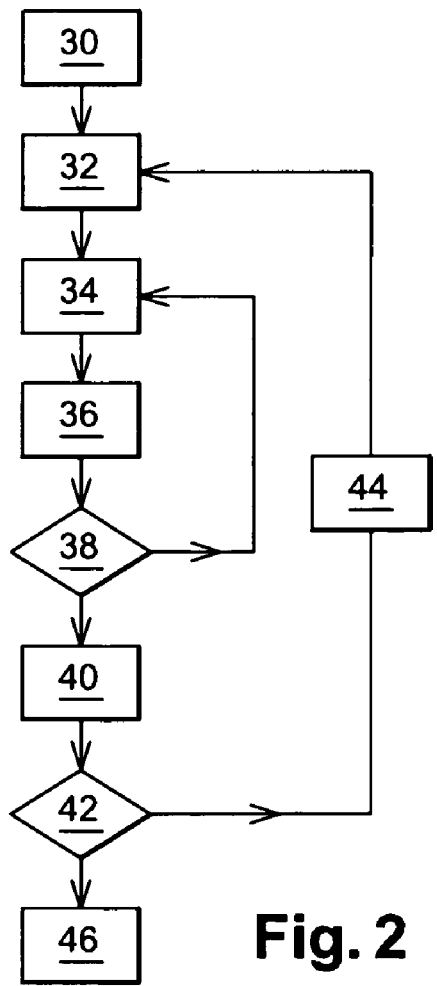
FIG. 2 shows the successive steps in a method of the invention.

FIG. 2 shows the successive steps of the processing method implemented by the filter 12.

The method comprises a first step 30 of initialization and reading the data supplied as input to the filter 12, in particular reading the files 16 and 18 During this step, an index i is initialized at 1 a bottom limit Binf is initialized at zero and a top limit Bsup is initialized at $N_i = N_1$.

During following step 32, a file $f_i$ is created, itself corresponding to the ith output data set 14$_1$.

Thereafter, in a step 34 of reading the input data set 10, the filter 12 searches for and then reads an XML data item from the data set 10 associated with a priority coefficient strictly greater than Binf and less than or equal to Bsup, or equal to zero.

During following step 36, the filter 12 accesses the tags corresponding to the XML data item and inserts the XML data item in the output file $f_i$.

During the following test step 38, the filter 12 verifies whether it has read the last XML data item in the input data set 10. If not, the method returns to step 34 to continue reading XML data in the input data set 10.

If the last XML data item has been read, then the method passes onto a step 40 of confirming and saving the output file $f_i$.

Then, during a test step 42, it is verified whether the output file $f_i$ that has been generated is the last output file that needs to be generated.

If not, then the method moves onto an incrementation step 44. During this step 44, the index i is incremented by unity, and then Binf is given the value $N_{i-1}$ and Bsup the value $N_i$. Thereafter the method returns to step 32 for creating a new file $f_i$.

Otherwise, if the test in step 42 finds that the last output file 14$_n$ has been generated, then the method moves onto an end-of-method step 46.

FIG. 3 shows how the output data sets provided by the method of the invention for processing description data are complementary, in accordance with the implementation described above. Only three output data sets are shown and they are referenced 14'$_1$ and 14'$_2$, and 14'$_3$. In this example, when a description data item is contained in one of the output data sets, it is not repeated in the other data set, with the exception of the priority data associated with the zero coefficient. Thus, as a function of the capacities of the network, or as a function of the storage capacities of the destination, only one, or two, or all three output data sets as generated by the filter 12 is/are transmitted.

In a variant, FIG. 4 shows the output data sets delivered by the method of processing description data in another implementation. Only three output data sets are shown and they are referenced 14"$_1$, 14"$_2$, and 14"$_3$ to distinguish them from the data sets provided by the above implement. In this implementation, the data set 14"$_1$ contains all of the data associated with priority coefficients less than $N_1$. The data set 14"$_2$ contains all of the description data associated with priority coefficients less than $N_2$, and the data set 14"$_3$ contains all of the description data associated with priority coefficients less than $N_3$. Consequently, the data set 14"$_3$ contains all of the description data that is contained in the data set 14"$_2$, which itself contains all of the description data contained in the data set 14"$_1$.

Thus, in this implementation, depending on the capacities of the network or the storage capacities of the destination, only one of the output sets generated by the filter 12 is transmitted.

The system shown in FIG. 5 shows a first use of the above-described method. In the implementation as described with reference to FIG. 3, in an application to broadcasting. It comprises a server 70' having storage means storing the input data set 10. The filter 12 is also implemented on the server 70'.

The threshold file 18 comprises, for example, three threshold values, and the filter 12 is configured to deliver the three output data sets 14'$_1$, 14'$_2$, and 14'$_3$ on the basis of these threshold values.

The server 70' is connected to a data transmission network 72 such as the Internet in order to broadcast the output data sets to different destinations, by using the Multicast function of the Internet.

Thus, for example, a first destination is a terminal 74 connected to the data transmission network 72 by a broadband (ADSL) line operating at 512 kilobits per second (Kbits/s).

A second destination is a terminal 76 connected to the data transmission network 72 by means of an ADSL line operating at 1024 Kbits/s.

Finally, a third destination is a terminal 78 connected to the data transmission network 72 by means of an ADSL line operating at 2048 Kbits/s.

The description data is broadcast by the server 70' to the terminals 74, 76, and 78 as follows, as a function of the capacities of their connections to the network 72:

only the data set 14'$_1$ is received by the terminal 74;
the data sets 14'$_1$ and 14'$_2$ are received by the terminal 76; and
the data sets 14'$_1$, 14'$_2$, and 14'$_3$, are received by the terminal 78.

The system shown in FIG. 6 represents a second use of the above-described method, in the implementation as described with reference to FIG. 4. This system comprises a server 70" connected to the data transmission network 72. The filter 12 is also implemented on the server 70".

The threshold file 18 has three threshold values, for example, and the filter 12 is configured to deliver the three output data sets 14"$_1$, 14"$_2$, and 14"$_3$ from these threshold values.

A first terminal 80, such as a second generation (GSM) mobile telephone is connected to the data transmission network 72 and is adapted to send a request $r_1$ to the server 70". This request contains information about the nature of the terminal 80 (GSM mobile telephone) and thus about its capacity for storage in response to said request (for example the server might limit its response for this terminal to 2 kilobytes (KB)).

A second terminal 82, for example a personal digital assistant (PDA), is connected to the data transmission network 72 and is adapted to issue a request $r_2$ to the server 70". This request contains information about the nature of the terminal 82 (PDA) and thus about its capacity for storage in response to said request (for example the server might limit its response to 3 KB for this terminal).

Finally, a third terminal 84, e.g. a microcomputer, is connected to the data transmission network 72 and is adapted to issue a request $r_3$ to the server 70". This request contains information about the nature of the terminal 84 (microcomputer) and thus about its capacity to store a response to the request (for example the server might limit its response for this terminal to 10 KB).

Consequently, the description data is transmitted by the server 70" to the terminals 80, 82, and 84 as follows, as a function of the capacities of their connections to the network 72:

only the data set 14"$_1$ is transmitted to the terminal 80;
only the data set 14"$_2$ is transmitted to the terminal 82; and
only the data set 14"$_3$ is transmitted to the terminal 84.

The invention claimed is:

1. A computer-executable method for use in a computer connected to a data communication network to which a destination is connected for processing multimedia content description data sets to deliver a plurality of output data sets intended for transmission through the data communication network, from a single input data set, the method comprising:
a processor in the computer performing the steps of:
obtaining instructions for giving priority coefficients to description data, the instructions being obtained independently of the input data set, and dynamically allocating the priority coefficients to at least some of the description data in the input data set according to the obtained instructions;
obtaining priority coefficient thresholds and associating the obtained priority coefficient thresholds with a predetermined number of output data sets;
distributing data of the single input data set to the output data sets as a function of the priority coefficients allocated to the description data of the input data set and as a function of the thresholds associated with each of the output data sets; and
transmitting through the data communication network at least one of the output data sets to the destination.

2. The computer-executable method of processing data sets according to claim 1 wherein a predetermined specific priority coefficient is allocated to description data that must be contained in all of the output data sets.

3. The computer-executable method of processing data sets according to claim 2 wherein each description data item to which a priority coefficient is allocated, other than said specific priority coefficient, is contained in only one of the output data sets as determined as a function of the thresholds associated with the output data sets.

4. The computer-executable method of processing data sets according to claim 2 wherein each description data item to which a priority coefficient is allocated, other than said specific priority coefficient, is contained in one or more of the output data sets as determined as a function of the thresholds associated with the output data sets, such that all of the data of any one output data set is contained in all other output data sets containing data of lower priority than the data of said any one output data set.

5. The computer-executable method of processing data sets according to claim 1 wherein the at least one of the output data sets is transmitted to the destination via means for transmitting description data to the destination, the at least one of the output data sets being determined as a function of capacities of the network for transmitting description data to the destination.

6. The computer-executable method of processing data sets according to claim 1 wherein the destination comprises storage means and wherein the at least one of the output data sets is determined as a function of storage capacities of the destination storage means.

7. The computer-executable method of processing data sets according to claim 1 wherein the step of transmitting at least one of the output data sets to a destination performed as a function of a subscription level of the user to a predetermined service.

8. The computer-executable method of processing data sets according to claim 1 further comprising a step of transmitting at least one of the output data sets to the destination as a function of a payment made previously for access to said data set.

9. The use of a computer-executable method of processing data sets according to claim 1 for processing an XML data file.

10. A non-transitory computer-readable storage medium on which is recorded a computer-executable program to be executed by a computer connected to a network for processing multimedia content description data sets in order to deliver a plurality of output data sets intended for transmission through the network, from a single input data set on a computer, the computer-executable program comprising instructions for carrying the steps of:

reading instructions for giving priority coefficients to description data, the instructions being obtained independently of the input data set, and dynamically allocating the priority coefficients to at least some of the description data in the input data set according to the read instructions;

reading a set of priority coefficient thresholds associated with a predetermined number of output data sets; and distributing data of the single input data set to the output data sets as a function of the priority coefficients allocated to the description data of the input data sets and as a function of the thresholds associated with each of the output data sets.

* * * * *